2,982,691
STABLE VITAMIN A COMPOSITIONS AND METHODS FOR MAKING SAME

Walter A. Winsten, 671 Fairview Ave., Westbury, N.Y.

No Drawing. Filed June 25, 1957, Ser. No. 667,990

9 Claims. (Cl. 167—81)

This invention relates to stabilizing vitamin A and other fat soluble vitamins in dry finely divided compositions. Specifically it rests on my discovery that low molecular weight polyethylene synthetic plastic improves vitamin A stability when contained in such compositions. It is also my finding that polyethylene of the types to be described improves the handling characteristics of vitamin A compositions to allow the production of a novel form of dry A product. This application represents a continuation in part of my invention on Stable Vitamin A Compositions, filed June 26, 1956, Serial No. 593,820. In that earlier application I describe my discovery that low molecular weight polyethylene where the molecular weight may be in the range 2000–12,000, and where a preferred molecular weight is molecular weight 4000, when combined with vitamin A, antioxidants, wetting agents, soy flour and the like, and most important with an hydrogenated fat or wax, then said polyethylene aids in producing a stabilizing influence on the vitamin A contained therein when subsequently one converts the matrix to a finely divided state, producing thereby a dry vitamin A composition consisting of many small particles.

In my aforementioned patent application the particles described wherein polyethylene exerts a stabilizing influence are for the most part spherical or ovoid in nature. They are particles as would be produced by spray cooling the melted composition or by emulsification. Both processes result in ovoid particles.

It is now new discovery that I can prepare excellent dry vitamin A products in which the vitamin A has substantial and practical stability and in which the finely divided particles which constitute the new invention are non-spherical and are rough shaped as would result from grinding operations. The key to my invention is the inclusion of polyethylene of the type as to molecular weight earlier described. By incorporating polyethylene into the compositions of vitamin A, wax, soy flour, antioxidants, wetting agents, etc., I can obtain compositions which upon grinding in a manner to be described are of high stability. Also the presence of polyethylene permits of rapid grinding at elevated temperatures at which compositions lacking polyethylene would be so weak as to make handling during the grinding impossible due to breaking up of the solidified hot matrix resulting from cooling a melt, during the grinding operation.

In carrying out my invention I like to use fully hydrogenated fats of high melting point, but preferably I like to use high melting waxes. In particular I favor microcrystalline waxes, paraffin waxes, beeswax, shellac wax and so on. For best results the wax should melt above 70 degrees centigrade.

In carrying out a preferred form of my invention I ment a microcrystalline wax. I add thereto polyethylene molecular weight in the range 2000–24,000. After stirring and heating to dissolve the polyethylene I then stir in soy flour 200 mesh, while maintaining the mixture in molten condition. In a separate container I combine fish liver oil or synthetic vitamin A in oil, lecithin, and antioxidants, also vitamins D and E as desired. The vitamin mixture is heated to about 85 deg. centigrade and is added to the wax, polyethylene, soy flour combination previously cooled to about 110 deg. centigrade. The mixture is thoroughly stirred and is then at once poured into moles and formed into slabs. These slabs of hardened product may while still hot (as hot as 70 degrees centigrade) be held against the face of a rapidly rotating wire wheel brush and are reduced thereby to a finely divided state. The finely divided product is then mixed with soy flour 200 mesh to improve the dry flow characteristics of the final product.

In my method I prefer to use a stainless steel wire brush which has 0.014 inch diameter wire spokes closely packed together. The wire wheel brush spins preferably at about 1700 r.p.m. although more rapid or less rapid speeds will work well. A prefer also to use polyethylene molecular weight 4000. However since microcrystalline wax (and paraffin wax in general) is when molten a fairly good solvent for polyethylene it has proved possible to use molecular weight polyethylene up to 24,000. On prolonged heating molecular weight polyethylene 19,000 will dissolve in molten microcrystalline wax but as a practical matter I use the more rapidly dissolving molecular weight 4000 polyethylene. Practically one can use rather easily also molecular weight 12,000 although it takes a a somewhat higher temperature than molecular weight 4000 to dissolve it in molten microcrystalline wax. Thus 4000 polyethylene dissolves easily in molten wax at 100 degrees C. Molecular weight 12,000 polyethylene goes into solution more readily at 140 degrees C. and only poorly at 100 degrees C.

The gelling action of polyethylene on molten wax makes it somewhat more viscous than wax without polyethylene. The higher the molecular weight the stronger the gelling action. Consequently when one cools a wax, soy flour, polyethylene combination to a temperature of 110 deg. C. prior to adding vitamin A, above molecular weight 12,000, the mixture becomes very viscous and thick and admixing the vitamin A becomes mechanically difficult. For this reason also practically one should not use polyethylene much above molecular weight 12,000.

In carrying out my invention I do not find it necessary to include more than 40% polyethylene in a final composition and indeed as the examples show I can use much less. I can also advantageously use mixtures of different molecular weight polyethylenes since lower molecular weight polyethylene seems to exert a solvent action on higher molecular weight plastic in these compositions.

I can of course allow the molten compositions to cool completely to room temperature and then subject them to the grinding action of the high speed wire wheel brush. By grinding hot however I can get exceedingly fast grinding action, up to 10 times the rate when grinding cold. The polyethylene allows the hot solidified slab to be so ground because it greatly strengthens the structure of the composition. Wax compositions with no polyethylene must be ground cold. These preparations without polyethylene suffer from a further defect. During cooling since the melt without polyethylene is very liquid any suspended soy flour tends to settle out. When subsequently the solidified melt is ground particles result of varying soy flour content and hence varying stability since as is well known soy flour markedly aids the stability of vitamin A in these preparations.

In this connection I should like to point out that prior to my invention it was known that a combination of wax, soy flour and fish liver oils could be combined to give fairly stable vitamin A compositions when in finely divided state. Thus Placak U.S. 1,764,085 discloses melted paraffin, cod liver oil and a dry granular vegetable substance such as soy bean meal, the molten mixture being stirred and cooled until in a granular condition. At the present time such a product as Placak describes would not be considered to be of high stability as to the vitamin A contained therein. A practical improvement was made in the invention of Placak by Hochberg and MacMillan U.S. 2,777,797, 2,777,798. These inventors claim that by spray cooling such compositions to give spheroidal particles, the resulting compositions have unexpectedly good stability with regard to the vitamin A contained therein.

It is now my invention that I can make compositions of improved stability with regard to the vitamin A contained therein by grinding and producing rough shaped particles more akin to those of Placak but which have stability equivalent to the best spray cooled products. I accomplish this by including polyethylene as heretofore described. I believe I obtain these good compositions because the polyethylene by its gelling action prevents the free escape of vitamin A oils to the surface of the ground particles and maintains the vitamin A oils in gelled condition within the body of the particles. As a result whether I prepare a ground preparation of 60 mesh or 80 mesh or 20 mesh the practical stability in all cases will be good. While obviously the less surface area (larger the particle) the better the stability, so long as the mesh size is near 40 mesh or as high or as low as indicated excellent products are obtained. Grinding as above with the wire wheel produces particles of about the indicated ranges i.e. 20–80 mesh. By hot grinding I can produce larger particles on the average than on cold grinding. Also by admixing some soy flour of let us say 40 mesh in the melt and grinding hot, this will also tend to produce particles in the larger size range.

I shall now describe examples of my invention although it is not to be construed that I limit myself to these.

*Example 1*

In a beaker I place 30 grams of microcrystalline wax (Warwick Wax Co. grade 180 brown, melting at about 82 degrees centigrade), and 10 grams of polyethylene (grade DYDT Carbide and Carbon Chemical Corp., molecular weight 4000). The mixture is melted by a free flame at about 100 degrees centigrade, the polyethylene dissolving easily in the molten wax. Now the temperature is raised to about 140–150 degrees centigrade and 30 grams of soy flour 200 mesh and 10 grams of soy bits about 40 mesh are stirred in while maintaining the temperature above 110 degrees centigrade. The mixture is allowed to cool to about 110 degrees centigrade and then to it is added a vitamin A, antioxidant, lecithin combination made as follows: In a separate beaker mix 15 grams of fish liver oil (400,000 units of vitamin A per gram), 6.0 grams of lecithin grade Gliddophil SM of the Glidden Company, 0.45 grams of an antioxidant solution code 10 A of the Nordigard Corp. which antioxidant solution contains 10% Nordihydroguairetic acid, 20% butylated hydroxy anisole and 6% citric acid, and finally add 0.1 gram of vitamin D₃, (one million units of vitamin B per gram).

Heat the vitamin A, lecithin, antioxidant, vitamin D mixture on a water bath to about 85 degrees centigrade and stir to dissolve the lecithin. Then add this combination to the wax, polyethylene, soy flour combination cooled to 110 degrees centigrade as mentioned above. Stir well and when uniform pour the melt into an aluminum foil mold. The product will be substantially solid at about 80 degrees centigrade. It is allowed to cool to about 60 degrees centigrade. The slab about ¾ inch thick is then held to the face of the rapidly rotating steel wire brush described earlier and is thereby ground to 20–80 mesh particles. These particles are collected and are further diluted with one quarter of their weight of 200 mesh extracted soy flour, to make them more free flowing.

When the above product is spread in thin layers in a glass dish and maintained four weeks at 45 degrees C. in open air in an oven there is no loss of vitamin A as determined by the USP XV spectrophotometric method. When also one part of the dry vitamin A product is mixed with five parts of a fifty-fifty mixture of steam bone meal and ground limestone (both known to destroy vitamin A), and the mixture placed in the oven at 45 degrees C. in an open dish, there is no loss of vitamin A in three weeks.

The product as prepared in Example 1 is an excellent source of vitamin A for the growing chick. Also the vitamin D contained therein is 100% available in the USP rat assay. The product of Example 1 assayed about 47,000 units of vitamin A per gram.

*Example 2*

This was prepared in the same manner as Example 1 except that in place of the fish liver oil as a source of vitamin A, 15 grams of vitamin A palmitate in corn assaying one million units of vitamin A per gram was substituted. The resultant product assayed 119,000 units of A per gram and its stability was equal to that of the product of Example 1.

*Example 3*

This was prepared in the same manner as Example 1 and with the same constituents except that in place of the microcrystalline wax used in Example 1, a different grade was used. Thus there was used 30 grams of microcrystalline wax Bareco wax 190/194 melting at about 90 degrees centigrade.

*Example 4*

This was prepared in the same manner as Example 1 and with the same constituents except that in place of 10 grams of polyethylene DYDT (molecular weight 4000), there was used 10 grams of polyethylene DYLT molecular weight 12,000 (Carbide and Carbon Chemical Corp.). The mixture of polyethylene and microcrystalline wax was heated to 150 degrees C. to dissolve the plastic in the molten wax.

*Example 5*

6 grams of polyethylene DYDT molecular weight 4000, 6 grams of polyethylene DYNF molecular weight 19,000 (Carbide and Carbon Chemical Corp.) and 12 grams of microcrystalline wax Warwick Wax Co. 180 Brown were melted together and heated at 160 degrees centigrade with stirring for 45 minutes till a thick uniform melt was obtained. Then 18 grams more of microcrystalline wax was melted into the mixture. To the melt at 150 degrees C. was added 30 grams of 200 mesh extracted soy flour and 10 grams of 40 mesh soy meal, maintaining the melt at a temperature above 110 degrees C. Then at 110 degrees C. there was added a fish liver oil, lecithin, antioxidant, vitamin D combination identical with that of Example 1, previously heated to 85 degrees C. After mixing and forming into a slab by cooling in a mold, and grinding as herein before described, the resultant product was combined with one fourth of its weight of 200 mesh soy flour.

The products of Examples 3–5 were all of excellent stability equivalent to that of Example 1, when placed in an oven at 45 deg. C. for four weeks in open dishes, none losing any vitamin A within the error of the assay method which is placed at plus or minus 5%.

*Example 6*

This was prepared in the same manner as Example 1 and with the same constituents except that the lecithin content was increased to 8.6 grams in the formula of Example 1 instead of 6.0 grams as previously used.

*Example 7*

This was prepared in the same manner as Example 1 except that the lecithin content was 2.0 grams in the formula of this example whereas in the formula of Example 1 6.0 grams of lecithin grade Gliddophil SM was used.

In comparing the stability of Examples 1, 6 and 7 when placed in the oven at 45 degrees C. for four weeks there was little to choose between them.

In comparing their stability when one part of each preparation was mixed with five parts of a commercial high minerals feeds supplement, obtained from Whitmoyer Laboratories, Myerstown, Pa., then the preparation with 8.6 grams of lecithin was most stable, that with 2.0 grams was least stable. In two weeks at 45 degrees C. in the high mineral mixture the preparation of Example 6 (most lecithin) lost about 40% of its vitamin A. On the other hand the preparation with the least lecithin lost about 80% of the contained vitamin A. It is to be pointed out that this particular mineral mixture which contained unknown amounts of trace minerals is destructive of every known commercial dry vitamin A. That is of a large number of commercial dry vitamin A preparations, when mixed with this mineral mixture, in 10 days in an accelerated test the vitamin A was either completely destroyed or its potency was sharply reduced. Thus this particular mineral mixture serves as a quick test to show differences of stability between various preparations. The commercial preparations tested included spray cooled products.

Using the Whitmoyer Laboratories mineral mixture as a testing medium it was found the polyethylene DYDT molecular weight 4000 gave the best result for a given formula in which only the type of polyethylene was changed. That is in a series of preparation the most stable in the indicated mineral mixture was the formula of Example 6 using DYDT, molecular weight 4000. Preparations containing higher molecular weight polyethylenes were progressively less stable in the mineral mixture. Also preparations with polyethylene of molecular weight 2000 were less stable than that with molecular weight 4000.

It is of course possible to improve on the stability of Example 6 by using a larger proportion of microcrystalline wax and polyethylene and soy flour to the proportion of vitamin A (whether fish liver oil, or synthetic vitamin A).

*Example 8*

45 grams of microcrystalline wax 180 brown (Warwick Wax Co.), 15 grams of polyethylene DYDT, molecular weight 4000 were melted togteher. To the melt was added 45 grams of 200 mesh soy flour and 15 grams of 40 mesh soy meal, while maintaining the mixture at 110–140 degrees centigrade. After cooling to 110 degrees C. there was added the vitamin A, lecithin, antioxidant vitamin D mixture of Example 1 and the rest of the preparation steps are identical with that of Example 1. The product in the Whitmoyer Laboratories mineral mixture in the proportion of one part of dry A and five parts mineral supplement, in an open dish at 45 deg. C. for two weeks lost 27% of the contained vitamin A. The product of this example when combined with five parts of a fifty-fifty mixture of ground limestone and steamed bone meal lost no vitamin A in four weeks at 45 deg. C. in open dishes.

The preparations of Examples 6 and 8 were the most stable I obtained as far as stability in the Whitmoyer Laboratories mineral mixture. When the Examples of 6 and 8 are repeated but without polyethylene being present and with said polyethylene being replaced in the formulae with additional microcrystalline wax then the resulting preparations are far less stable in the Whitmoyer Laboratories mineral mixture, thus showing the stabilizing influence of the polyethylene molecular weight 4000, in these formulae. Thus Example 6 was repeated. In place of 30 grams of wax and 10 grams of polyethylene molecular weight 4000, 40 grams of wax was used. Also in Example 8 in place of 45 grams of wax and 15 grams of polyethylene, 60 grams of wax was used. In two weeks at 45 degrees in open dishes in air the resulting wax preparations lacking polyethylene lost upward of 90% of the contained vitamin A when mixed with the Whitmoyer Laboratories mineral mixture, in the proportion of one part of product to five parts mineral mixture. Thus I confirm for ground products the stabilizing influence of polyethylene previously discovered and claimed in my earlier patent application, wherein ovoid particles containing polyethylene are described.

I have therefore discovered that I can improve on the invention of Placak previously referred to by incorporating with vitamin A, wax and soy flour, my new additive polyethylene preferably of molecular weight 4000 as indicated. By using polyethylene in such compositions I have found that the resultant compositions lend themselves to grinding in a novel manner, namely by the use of a high speed wire wheel brush. To my knowledge no one before me has ever ground vitamin A compositions in this way. Since I can grind compositions while they are still in the form of hot slabs I can obtain remarkable production rates as compared to grinding cold slabs with the same wire wheel brush. Thus when a hot slab containing polyethylene as heretofore described is held to the face of the rotating brush with moderate hand pressure the product can be ground almost as fast as desired, so rapidly does the brush bite into the hot composition. It is of course practically impossible to grind such compositions when hot if polyethylene is absent and one must grind cold and at a slower rate if no polyethylene is present. Lacking polyethylene, wax compositions at elevated temperature, as slabs, are too weak structurally and cannot be handled when hot since they break up in the hand when held to the face of the rotating brush. In the past when one desired to grind wax like materials it has been customary to freeze the wax matrix prior to grinding so that it does not smear on the grinding surface. Wire wheel grinding of wax like materials provides a ripping action by hundreds of small cutting points which tear out fine particles. This action is especially valuable in grinding the vitamin A compositions of the type described. When these contain polyethylene then one can grind while the matrix is still hot, at a very rapid grinding rate. In the absence of polyethylene the products may be wire wheel ground at room temperature although the rate of grinding is much slower than in hot grinding.

In place of polyethylene I can use polypropylene of molecular weight in the same range as for polyethylene.

*Example 9*

This is the same as Example 1 except that an experimental batch of polypropylene molecular weight 4000 was used in place of the polyethylene of Example 1. In addition to soy flour used in earlier examples, I can use generally finely divided vegetable flours. I can use for instance wheat germ flour. I can also use torula yeast or bakers yeast or other finely divided products as result from fermentations to produce vitamins such as vitamin B–12 and riboflavin. However I prefer the vegetable flours for these as is well known do themselves aid in stabilizing vitamin A in wax and hydrogenated fat type compositions.

I claim:

1. New stabilized vitamin A compositions in finely divided rough shaped non-spherical form comprising a source of vitamin A, a waxy solid, a vegetable flour and a gelling resin selected from the group consisting of polyethylenes having a molecular weight in the range of 2,000–24,000.

2. A new composition in accordance with claim 1 wherein the source of vitamin A is a member of the group consisting of fish liver oil, vitamin A concentrate and synthetic vitamin A ester.

3. A new composition in accordance with claim 1 wherein the waxy solid is a microcrystalline wax.

4. A new composition in accordance with claim 1 wherein the polyethylene has a molecular weight of 4,000.

5. A new composition in accordance with claim 1 wherein the vegetable flour is soy flour.

6. The process of making compositions in accordance with claim 1 which comprises making a melt of the constituents, casting the melt into slabs and then grinding the solidified slabs.

7. The process in accordance with claim 6 wherein the grinding is effectuated by the action of a high speed rotating wire wheel brush.

8. The process in accordance with claim 6 wherein the slab is still hot but below its melting point when subjected to the grinding action of the rotating wire wheel brush.

9. The process in accordance with claim 6 wherein the slab is at room temperature when subjected to the grinding action of the wire wheel brush.

References Cited in the file of this patent

UNITED STATES PATENTS

| | | |
|---|---|---|
| 1,764,085 | Placak | June 17, 1930 |
| 2,446,345 | Snow | Aug. 3, 1948 |
| 2,556,278 | Irvine | June 12, 1951 |
| 2,627,938 | Frohmader | Feb. 10, 1953 |
| 2,628,187 | Frohmader | Feb. 10, 1953 |
| 2,738,303 | Blythe | Mar. 13, 1956 |
| 2,793,979 | Svedres | May 28, 1957 |
| 2,798,023 | Berger | July 2, 1957 |

FOREIGN PATENTS

| | | |
|---|---|---|
| 514,047 | Great Britain | Oct. 30, 1939 |